United States Patent
Bauer et al.

(10) Patent No.: US 9,909,628 B2
(45) Date of Patent: Mar. 6, 2018

(54) TRANSMITTER FOR A SYNCHRONISING ASSEMBLY OF A MANUAL TRANSMISSION AND A METHOD FOR PRODUCING A TRANSMITTER

(71) Applicant: HOERBIGER Antriebstechnik Holding GmbH, Schongau (DE)

(72) Inventors: Michael Bauer, Peissenberg (DE); Juergen Binder, Schongau (DE); Berthold Negele, Schwabsoien (DE); Georg Ruprecht, Biessenhofen (DE)

(73) Assignee: HOERBIGER Antriebstechnik Holding GmbH, Schongau (DE)

( * ) Notice: Subject to any disclaimer, the term of this patent is extended or adjusted under 35 U.S.C. 154(b) by 147 days.

(21) Appl. No.: 14/965,486

(22) Filed: Dec. 10, 2015

(65) Prior Publication Data

US 2016/0178017 A1    Jun. 23, 2016

(30) Foreign Application Priority Data

Dec. 17, 2014   (DE) .................. 10 2014 118 916

(51) Int. Cl.
    *F16D 23/06*    (2006.01)
(52) U.S. Cl.
    CPC ......... *F16D 23/06* (2013.01); *F16D 23/0606* (2013.01); *F16D 2023/0618* (2013.01); *F16D 2250/0053* (2013.01); *F16D 2250/0076* (2013.01)
(58) Field of Classification Search
    CPC .............. F16D 23/06; F16D 23/0606; F16D 2023/0618; F16D 2023/0631; F16D 2250/0053; F16D 2500/0076; B23K 31/02

See application file for complete search history.

(56) References Cited

U.S. PATENT DOCUMENTS

| 6,016,895 A * | 1/2000 | Schwuger ............... F16D 23/06 192/219 |
| 9,062,720 B2 | 6/2015 | Binder et al. |
| 2013/0233668 A1* | 9/2013 | Binder .................... F16D 23/06 192/69.7 |

FOREIGN PATENT DOCUMENTS

| DE | 202009004323 U1 | 7/2009 |
| DE | 202009016227 U1 | 4/2011 |
| DE | 102010036278 A1 | 3/2012 |
| DE | 102013101695 A1 | 8/2014 |

OTHER PUBLICATIONS

Machine translation of DE 102013101695 A1 downloaded from EPO.org on Jun. 30, 2017.*
German Search Report dated Sep. 9, 2015 from corresponding DE Application No. 102014118916.7, along with unofficial English translation, 9 pages.

* cited by examiner

*Primary Examiner* — Richard M Lorence
(74) *Attorney, Agent, or Firm* — Dilworth IP LLC

(57) ABSTRACT

A transmitter for a synchronizing assembly of a manual transmission has a transmitter disk and at least one clutch disk which is arranged on a side surface of the transmitter disk. The clutch disk and the transmitter disk are fixedly connected together by local welding points. A method for producing a transmitter for a synchronizing assembly of a manual transmission consists of providing a clutch disk and a transmitter disk. Then, the clutch disk and the transmitter disk are fastened together by means of projection welding. Finally, the thus formed assembly is hardened.

11 Claims, 15 Drawing Sheets

TRANSMITTER FOR A SYNCHRONISING ASSEMBLY OF A MANUAL TRANSMISSION AND A METHOD FOR PRODUCING A TRANSMITTER

The invention relates to a transmitter for a synchronising assembly of a manual transmission, having a transmitter disk and at least one clutch disk which is arranged on a side surface of the transmitter disk. The invention also relates to a method for producing a transmitter for a synchronising assembly of a manual transmission.

BACKGROUND OF THE INVENTION

A synchronising assembly of a manual transmission, as used in particular in motor vehicles, is used, in general terms, to establish a rotationally-fixed connection between a transmission shaft and a gear wheel or toothed wheel arranged on the transmission shaft as an idler wheel. In a first step of the gear-shifting process, the synchronising assembly ensures that the rotational speed of the gear wheel to be shifted matches the rotational speed of the transmission shaft. In a second step, a rotationally-fixed connection is established between the transmission shaft and the gear wheel. The corresponding gear is then shifted.

A widely used type of synchronising assembly is known under the name "BorgWarner synchronisation". This synchronising assembly uses a shift collar which is arranged on a synchronising body in a rotationally-fixed but axially displaceable manner, said body being connected to the transmission shaft for conjoint rotation therewith. The shift collar can be displaced from an initial position in the axial direction to a gear wheel. A synchronising ring is initially activated hereby which synchronises the rotational speed of the gear wheel with the rotational speed of the transmission shaft. As soon as this process is complete, the shift collar can be further displaced in the axial direction until it establishes a rotationally-fixed connection with the corresponding gear wheel.

As an alternative to this type of synchronising assembly, a type which uses the transmitter mentioned in the introduction is known. An example of this can be seen in DE 10 2010 036 278 A1. In general terms, the transmitter combines the synchronising body and the shift collar in one component which is mounted so as not to rotate relative to the transmission shaft and can be displaced in the axial direction. If the transmitter is displaced in the axial direction from a neutral position, a synchronising ring (or even an assembly consisting of a plurality of synchronising rings) is initially activated, whereby the rotational speed of the corresponding gear wheel is synchronised with the rotational speed of the transmission shaft. In a second step, the transmitter can then be interconnected, whereby a rotationally-fixed connection is established between the transmission shaft and the corresponding gear wheel.

The object of the invention is to provide a transmitter which can be produced at low cost.

BRIEF DESCRIPTION OF THE INVENTION

In order to achieve this object, a transmitter is provided which has a transmitter disk and at least one clutch disk which is arranged on a side surface of the transmitter disk. The clutch disk and the transmitter disk are fixedly connected together by local welding points. These can be produced quickly, reliably and at low cost, for example by resistance welding. Since the torque is transmitted from the transmission toothed wheels to the transmission shaft substantially directly via the clutch disks and not via the transmitter disk, the welding points are also not subjected to any particularly high loads.

Projections are preferably provided which form the welding points. This ensures that the welding points are produced precisely at the desired positions.

In accordance with a preferred embodiment, spacers are provided, on which the projections are formed, in particular on the transmitter disk. The spacers allow a pressure piece to be arranged in the transmitter disk, the dimensions of which pressure piece are larger in the axial direction than the thickness of the transmitter disk. This allows in particular a comparatively robust compression spring to be arranged in the transmitter disk.

In order to achieve the above-mentioned object, a method for producing a transmitter for a synchronising assembly of a manual transmission is also provided in accordance with the invention, said method comprising the following steps: initially, a clutch disk and a transmitter disk are provided. Then, the clutch disk and the transmitter disk are fastened together by means of projection welding. Then, the thus formed assembly is hardened. This sequence of welding and hardening ensures that the material has, during welding, the optimum properties therefor.

The assembly can either be freely hardened, i.e. hardened and quenched or it is also possible for the assembly to be hardened on a mandrel which, for example, engages into an internal toothed arrangement of the clutch disk and thus limits the distortion due to hardening at that location.

In accordance with a preferred embodiment, provision is made that the transmitter disk is provided with at least one recess, and that after the assembly is hardened a pressure piece is mounted in the recess. The pressure piece can be inserted into the recess allocated thereto in an extremely simple manner in mechanical terms, wherein it is optionally guided between the clutch disks.

In accordance with a preferred embodiment of the invention, provision is made that the pressure piece is clipped into the recess. This ensures that the pressure piece remains in the recess allocated thereto after being assembled without any further aids.

In accordance with a preferred embodiment of the invention, provision is made that the pressure piece is provided with a base part and a guide part, wherein the base part is located between two clutch disks which are arranged on sides of the transmitter disk facing away from each other, and that the guide part is guided in the axial direction between edges of the recess which are opposite one another in the circumferential direction. This design produces a particularly precise guidance of the pressure piece in the recess, whereby the shifting behaviour is optimised.

Advantageous embodiments of the invention are apparent from the dependent claims.

BRIEF DESCRIPTION OF THE DRAWINGS

The invention will be described hereinafter with the aid of an embodiment which is illustrated in the attached drawings. In the drawings:

FIGS. 7b to 7e show different embodiment variants of the region marked with VII in FIG. 7a;

DETAILED DESCRIPTION OF THE INVENTION

Figure 1:
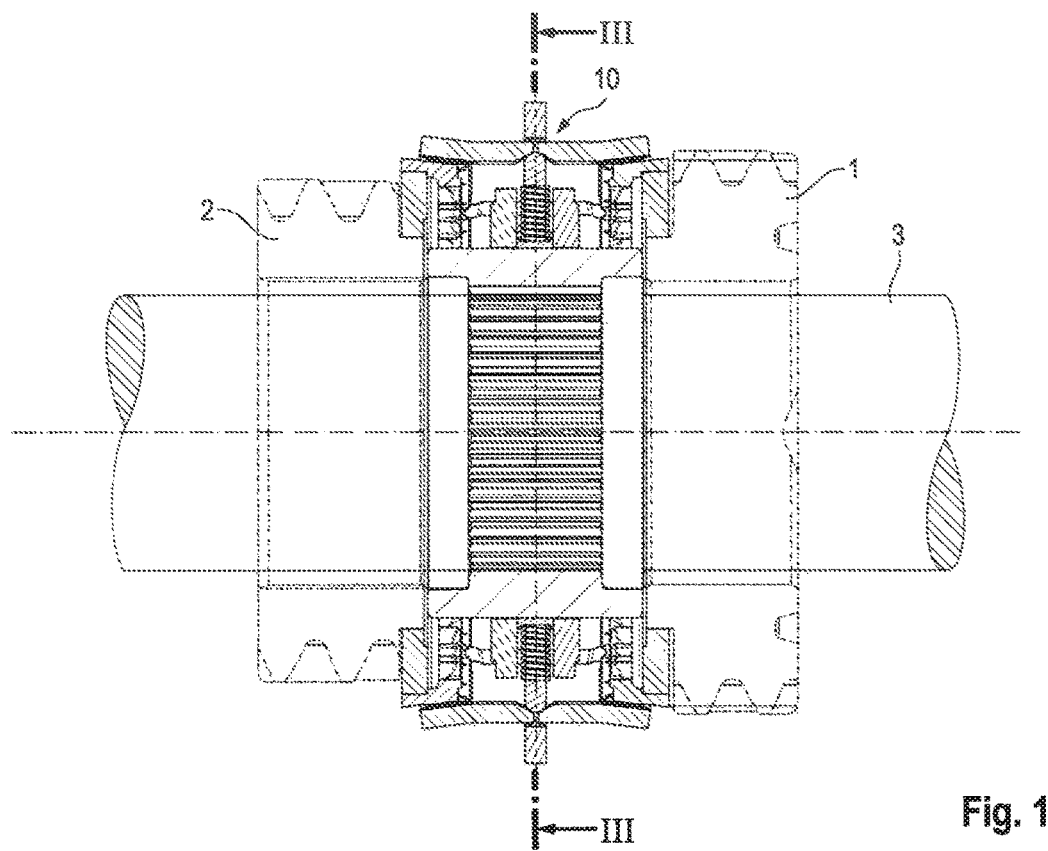
FIG. 1 shows a schematic longitudinal sectional view of a synchronising assembly having a transmitter in accordance with the invention.

FIG. 1 schematically shows a synchronising assembly which comprises two transmission toothed wheels 1, 2 which can each be connected to a transmission shaft 3 for conjoint rotation therewith depending upon the shifted gear. For this purpose, a transmitter 10 is provided which can be adjusted in the axial direction relative to the transmission shaft 3.

Where the terms "axial" or "radial" are used hereinafter, they refer to the rotational axis of the transmission shaft 3 and of the transmitter 10.

The basic design of the synchronising assembly is explained hereinafter with reference to FIGS. 1 to 5, whilst details will be explained further hereinafter with reference to FIGS. 6 to 22.

The transmitter 10 comprises a transmitter disk 12 which is provided with a clutch disk 14 on each of its two side surfaces. Each clutch disk 14 comprises, on its radially inner circumference, a transmission shaft toothed arrangement 16 and, on its radially outer circumference, a clutch toothed arrangement 18 (see in particular FIG. 2).

The transmission shaft toothed arrangements 16 of the clutch disks 14 are accommodated on an external toothed arrangement 20 of a transmitter sleeve 22 in a rotationally-fixed but axially displaceable manner. In turn, the transmitter sleeve 22 is arranged on the transmission shaft 3 in a rotationally-fixed manner. For this purpose, the transmitter sleeve 22 can be provided with an internal toothed arrangement 24 (see in particular FIGS. 3 to 5).

The clutch toothed arrangement 18 of each clutch disk 14 is provided so as to co-operate with a gear wheel clutch toothed arrangement 26 allocated thereto and provided on the transmission toothed wheels 1, 2. In the illustrated exemplified embodiment, each gear wheel clutch toothed arrangement 26 is provided on the inner surface of a friction ring 28 which is provided on its outer side with a slightly conical friction surface 30. Each friction ring 28 is connected, e.g. welded or soldered, to the transmission toothed wheel 1, 2 allocated thereto for conjoint rotation therewith.

Arranged on the transmitter disk 12 are two synchronising rings 32 which lie one on either side of the transmitter disk 12 and are provided so as to co-operate with the friction surfaces 30 of the friction rings 28. For this purpose, the synchronising rings 32 are provided with a friction lining 34 on their inner surface.

The synchronising rings 32 are basically connected to the transmitter disk 12 for conjoint rotation therewith but they can also rotate relative thereto about a small angular range. Furthermore, the synchronising rings 32 are attached in the axial direction to the transmitter disk 12 but they can also be adjusted to a certain extent in the axial direction starting from a centre or initial position.

Each synchronising ring 32 is provided with three different types of lugs which extend through allocated openings, recesses or apertures in the transmitter disk, or at least extend into same: connecting lugs 36, 37, stop lugs 38 and locking lugs 40.

The connecting lugs 36, 37 are used to mechanically connect the two synchronising rings 32 to each other in the axial direction. For this purpose, each synchronising ring 32 has a connecting lug 36 which has a wide head at its free end and transitions into the synchronising ring-side section of the connecting lug 36 via a narrower neck.

Each connecting lug 37 has an aperture which has a larger section adapted to the dimensions of the head of the connecting lug 36 and a narrower section adapted to the dimensions of the neck of the connecting tug 36.

The connecting lugs 36, 37 extend, when engaged with each other, through two openings 42, allocated thereto, in the transmitter disk. The width of the openings 42 in the circumferential direction is greater than the width of the connecting lugs 36, 37 in the circumferential direction.

The stop lugs 38 have a constant width and extend into apertures 44 which are likewise provided in the transmitter disk 12. The width of the apertures 44 in the circumferential direction is slightly greater than the width of the stop lugs 38 in the circumferential direction.

The locking lugs 40 each extend into a recess 46 in the transmitter disk 12. The mutually facing ends of the locking lugs 40 in the initial position are located opposite each other and centrally within the recess 46 (see in particular FIG. 4).

Each locking lug 40 comprises, in proximity to its free end, two locking surfaces 48 which face away from each other and extend in an inclined manner relative to the extension direction of the locking lugs 40. In this case, the locking surfaces 48 form, with an extension of the outer edges of the locking lugs 40, an angle in the order of magnitude of 60°.

The locking surfaces 48 co-operate with the edges 50 of the corresponding recess 46, which edges are opposite each other and extend in parallel with each other, and, more specifically, the locking surfaces each co-operate with a bevel 52 which is provided on the corresponding edge. The orientation of the bevels 52 corresponds to the orientation of the locking surfaces 48 so that these can lie flat against each other.

The locking lugs 40 comprise, on the radially inner side of each of their free ends, a centring bevel 54 (see in particular FIG. 4), on which an outwardly directed pressure surface 56 of a pressure piece 58 engages.

Each pressure piece 58 comprises a guide part 60 which is held between the edges 50 of the corresponding recess 46 in the axial direction, a base part 62 which is arranged on the radially inner end of the recess 46, and a compression spring 64 which exerts a force upon the guide part 60 and the base part 62, said force intending to move the guide part 60 away from the base part 62.

Figure 2:
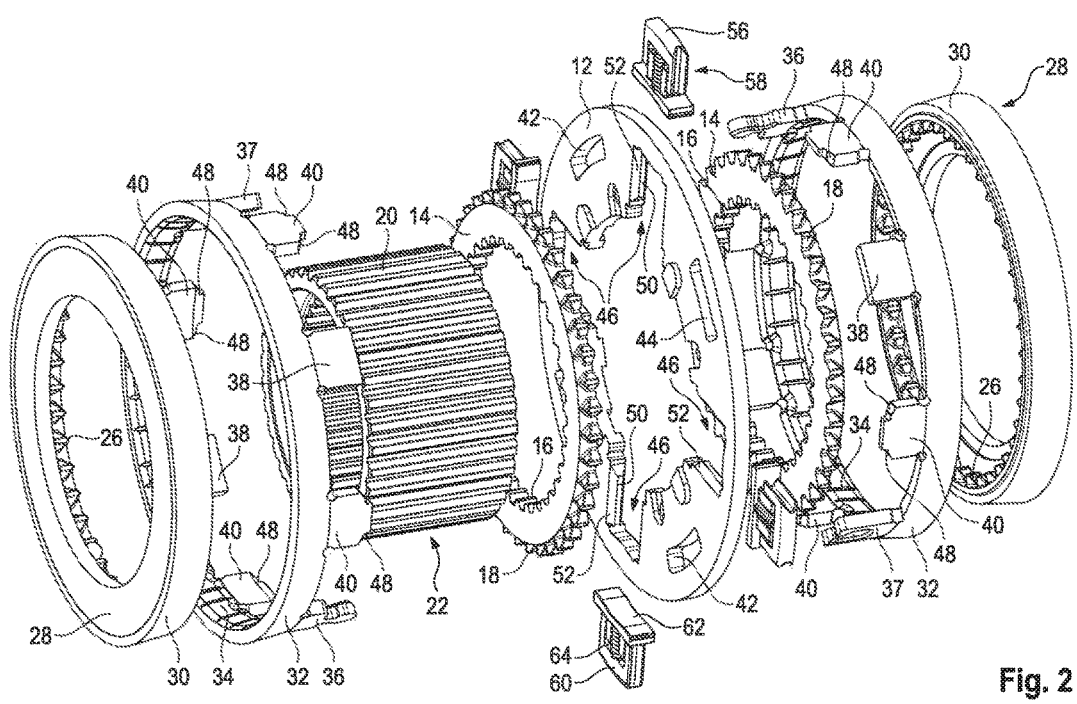
FIG. 2 shows an exploded view of the synchronising assembly of FIG. 1.
Figure 3:
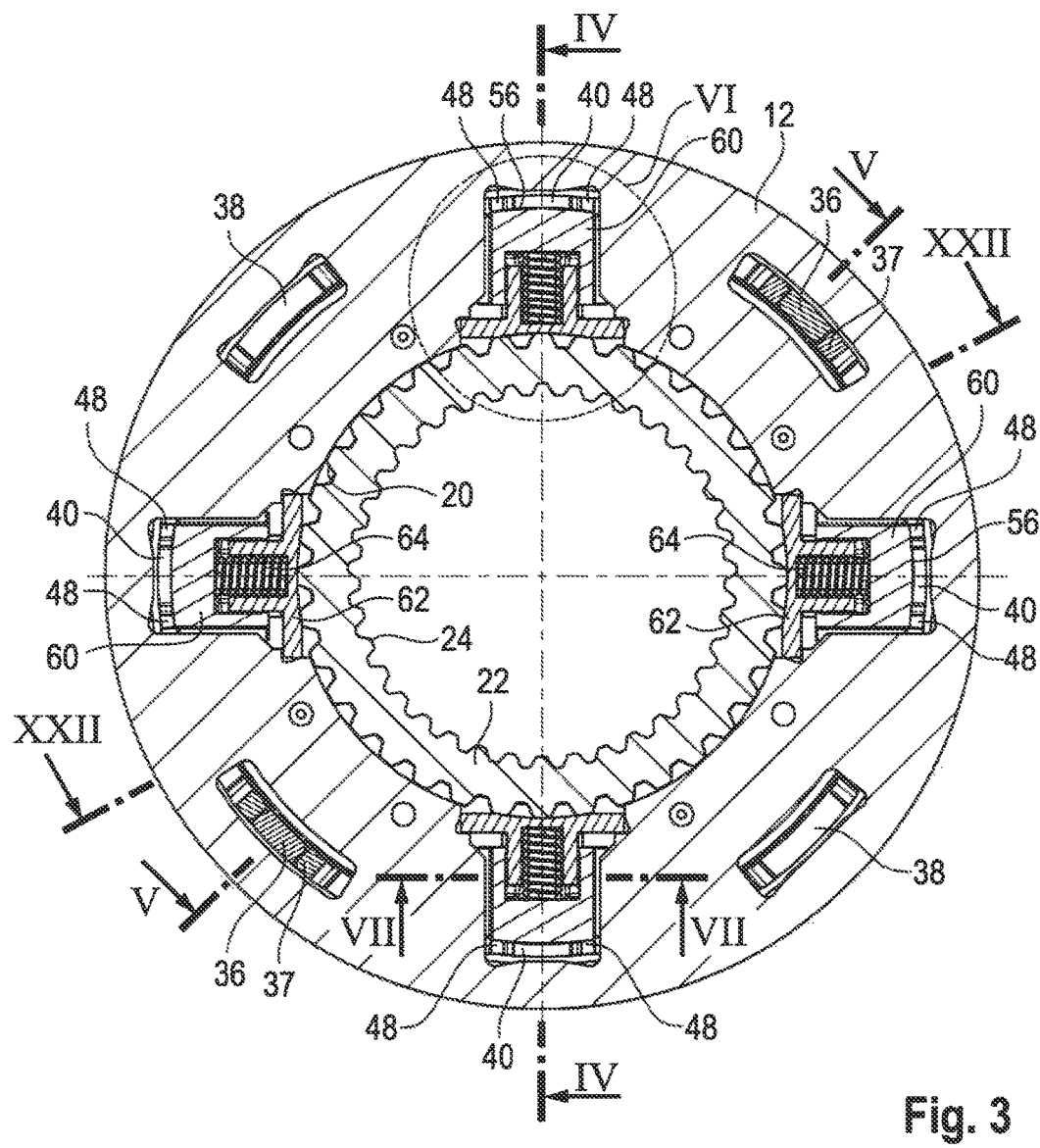
FIG. 3 shows a sectional view along plane of FIG. 1.

As can be seen in particular in FIG. 2, the transmitter comprises four locking lugs 40 per synchronising ring 32, which lugs are evenly spaced apart from each other in the circumferential direction, and two connecting lugs 36, 37 which lie diametrically opposite one another, and two stop lugs 38 which lie diametrically opposite one another. The diameter defined by the two connecting lugs 36, 37 is perpendicular to the diameter defined by the two stop lugs 38. In other words: the connecting lugs and the stop lugs are arranged so as to be staggered with respect to one another by an angle of 90°.

The process of shifting a gear and synchronising the rotational speeds of the transmission shaft and of the transmission toothed wheel to be shifted is basically performed in the same manner as described in DE 10 2010 036 278 A1: if a gear is to be shifted, the transmitter disk 12 is displaced in the axial direction by means of an actuating device (not shown herein). The two synchronising rings 32 connected together are entrained in the axial direction because the pressure surfaces 56 of the pressure pieces 58 mounted on the transmitter disk 12 lie between the two V-shaped centring bevels 54 and the spring force provided by the compression springs 64 produces sufficient friction.

As soon as the synchronising ring 32 comes into engagement with the friction surface 30, allocated to the transmission toothed wheel to be shifted, the synchronising ring (assuming a difference in rotational speed between the transmission toothed wheel and the transmission shaft) is entrained in the circumferential direction until one of the outer edges of each of the two stop lugs 38 comes to lie against the edge of the corresponding aperture 44 in each case. The position of the synchronising rings is hereby defined in the circumferential direction.

If, in this state, the transmitter disk 12 is further displaced in the axial direction, it is displaced axially relative to the synchronising rings 32 because the active synchronising ring 32 is supported in the axial direction on the friction surface 30 of the transmission toothed wheel to be shifted. By way of this axial displacement of the transmitter disk 12 relative to the synchronising ring 32, one of the bevels 52 at the edge of each recess 46 comes to lie against one of the locking surfaces 48 on each of the locking lugs 40, and in particular the ones which have been moved towards each other owing to the relative movement between the synchronising rings 32 and the transmitter disk 12.

The transmitter disk 12 can only then be further adjusted in the axial direction if the synchronising rings 32 can, via the mutually co-operating locking surfaces 48 of the synchronising rings and bevels 52 of the transmitter disk, be rotated back in the circumferential direction to the extent that the locking surfaces 48 no longer lie against the bevels 52 but rather the outer edges of the locking lugs 40 extending in the axial direction slide along the edges 50 of the recesses 46. However, it is only possible to re-adjust the synchronising ring 32 in the circumferential direction (expressed simply) when the rotational speeds of the transmission toothed wheel to be shifted and the transmission shaft match one another. Specifically: the synchronising ring 32 can then be unlocked if the unlocking moment (reverse torque), resulting from the shifting force and the locking geometry (bevel angle and coefficient of friction) is greater than the synchronising moment on the friction surface of the synchronising ring.

If the rotational speeds of the transmission toothed wheel and the transmission shaft match one another, the synchronising rings 32 are rotated slightly in the circumferential direction (owing to the effect of the bevels 52 on the locking surfaces 48), and therefore the transmitter disk 12 can be further shifted in the axial direction. The guide parts 60 of the pressure pieces 58 yield radially inwards because they are adjusted inwardly by the centring bevels 54.

The transmitter disk 12 is adjusted in the axial direction to the extent that the clutch toothed arrangement 18 of the clutch disk 14 located at the front in the adjusting direction engages into the corresponding gear wheel clutch toothed arrangement 26. As a result, a rotationally-fixed connection is established from the transmission shaft 3, via the transmitter sleeve 22, the transmission shaft toothed arrangement 16, the clutch disk 14, the clutch toothed arrangements 18 and the gear wheel clutch toothed arrangement 26, to the corresponding transmission toothed wheel.

The design of the pressure pieces 58 and their attachment in the recesses 46 of the transmitter disk 12 will be explained hereinafter with reference to FIGS. 6 to 17.

The guide part 60 of each pressure piece 58 consists of synthetic material and is formed in particular as an injection moulded part. It comprises a cross-bar 70 (see in particular FIGS. 9, 10 and 12), wherein two latching arms 72 extend in parallel with each other in the same direction from the ends of the cross-bar which face away from each other. The cross-bar 70 is provided with the pressure surface 56 on the side opposite the latching arms 72. This pressure surface is slightly curved, wherein the radius of curvature which determines the curvature in the circumferential direction is on a central plane M on the side towards which the two latching arms 72 also extend (see the indicated radius r in FIG. 12). The radius r approximately corresponds to the radius on which the locking lugs 40 lie.

Figure 7A:
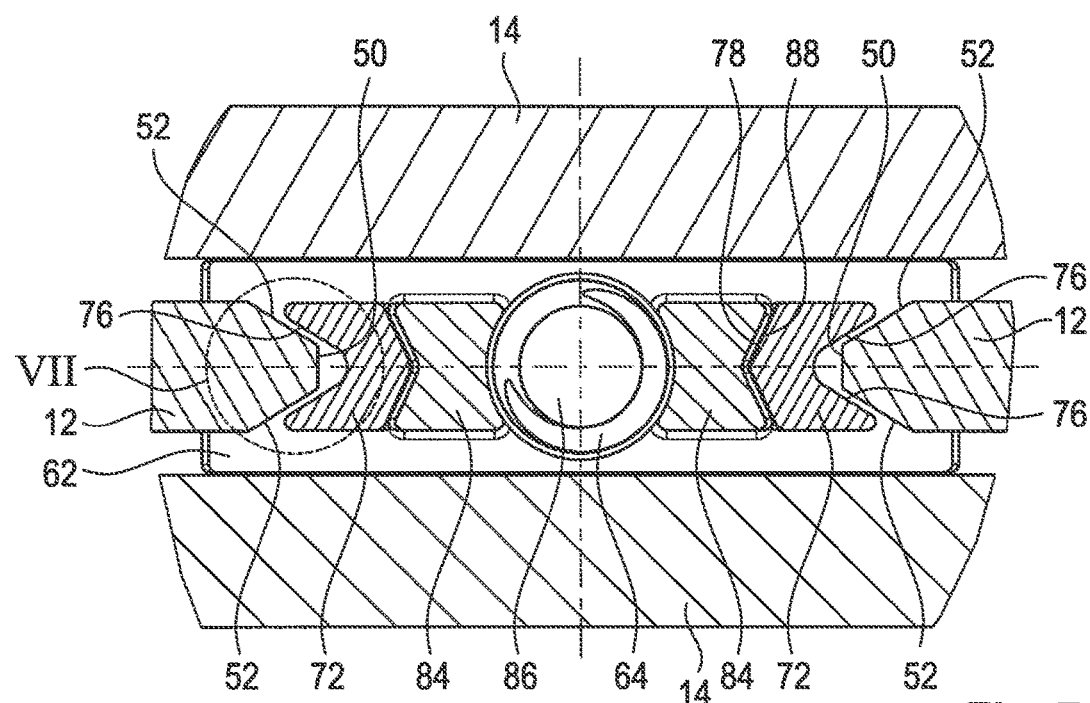
FIG. 7a shows a sectional view along plane VII-VII of FIG. 3.

The outer edges of the latching arms 72 facing away from each other are each provided with a guide contour 74 which is formed by guide surfaces 76 arranged in a V-shape (see FIG. 7a). The apexes of the two V-shaped guide contours 74 are rounded and the two apexes face each other. In other words: the guide contours 74 are formed as grooves along the outer edges of the latching arms 72.

Designs other than the V-shape can also be used in the region of the contact between the latching arms 72 and the transmitter disk. Examples are shown in FIGS. 7b to 7e.

Figure 7B:
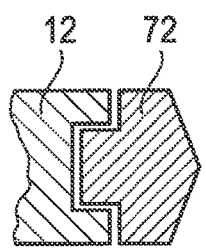

In FIG. 7b, the edge of the transmitter disk 12 is concave on the side thereof facing the corresponding latching arm 72, and specifically has a rectangular groove (as seen in cross-section). A complementarily convex outer edge of the corresponding latching arm 72 engages into said groove.

Figure 7C:
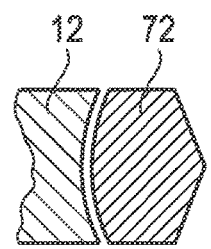

In FIG. 7c, the edge of the transmitter disk 12 is likewise concave on the side thereof facing the corresponding latching arm 72, and specifically is formed as a depression with a curved bottom (as seen in cross-section). A complementarily convex outer edge of the corresponding latching arm 72 engages into said depression.

Figure 7D:
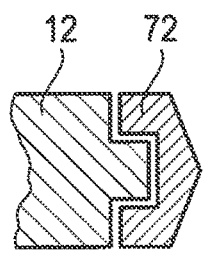

In FIG. 7d, the edge of the transmitter disk 12 is convex on the side thereof facing the corresponding latching arm 72, and specifically has a rectangular protrusion (as seen in cross-section). Said protrusion is accommodated in a complementary groove having a rectangular cross-section in the outer edge of the corresponding latching arm 72.

Figure 7E:
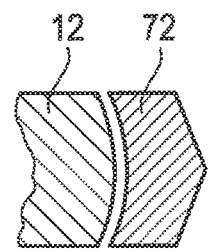
Figure 8:
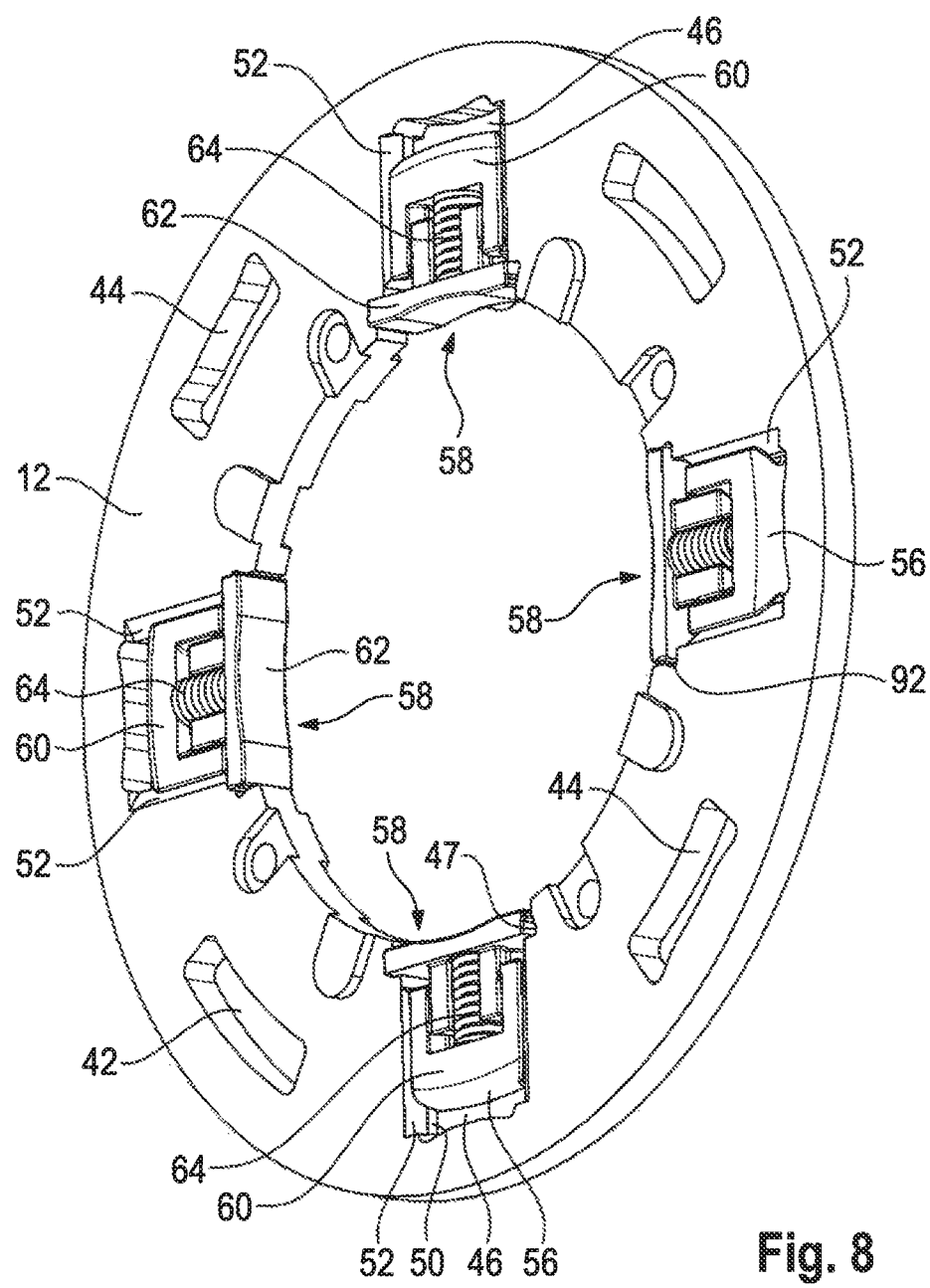
FIG. 8 shows a perspective view of the transmitter disk of the transmitter in accordance with the invention having pressure pieces mounted therein.

In FIG. 7e, the edge of the transmitter disk 12 is likewise convex on the side thereof facing the corresponding latching arm 72, and specifically is formed as a protrusion with a curved end face (as seen in cross-section). Said protrusion is accommodated in a complementary convex depression in the outer edge of the corresponding latching arm 72.

Figure 11:
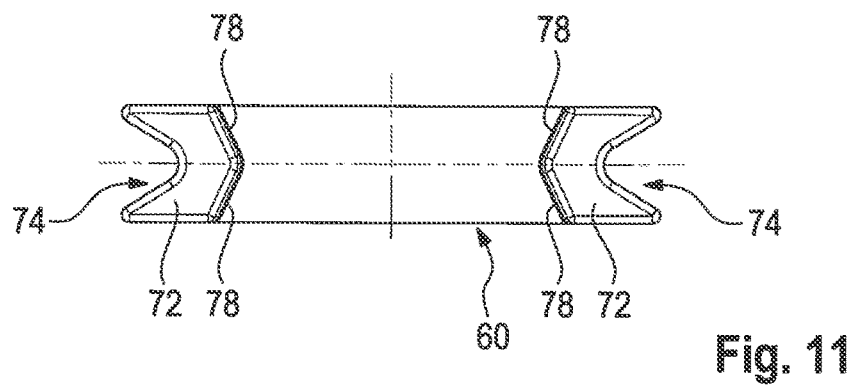
FIG. 11 shows a bottom view of the guide part of FIG. 10.

Formed on each of the mutually facing inner edges of the latching arms 72 are two V-shaped sliding guide surfaces 78 (see in particular FIG. 11). The apex of the V-shaped contour is also rounded in this case and the apexes fie opposite one another. The two V-shaped contours on the inner side and outer side of the latching arms 72 are thus oriented in the same direction. However, the angles are different. Whilst the guide surfaces 76 together form an angle of less than 90°, the sliding guide surfaces 78 together form an angle of greater than 90° (likewise as measured on the "inner side" of the V-shaped contour). The crown angle for the guide contour 74 is in the order of magnitude of 60° whilst the crown angle for the sliding guide contour formed by the sliding guide surfaces 78 is in the order of magnitude of 120°.

Figure 12:
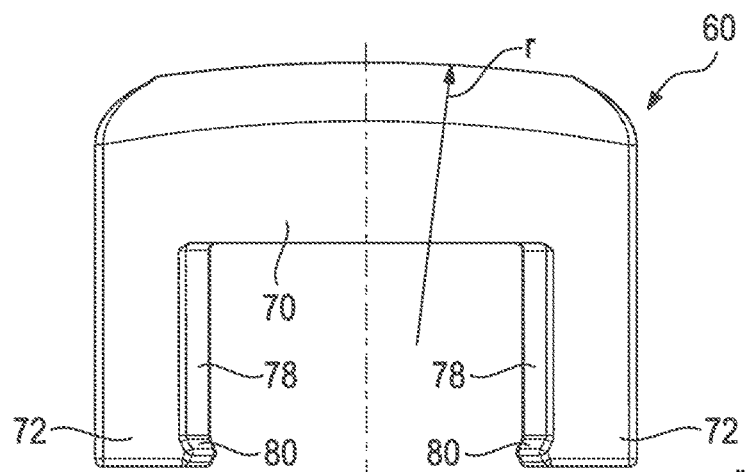
FIG. 12 shows a side view of the guide part of FIG. 10.
Figure 13:
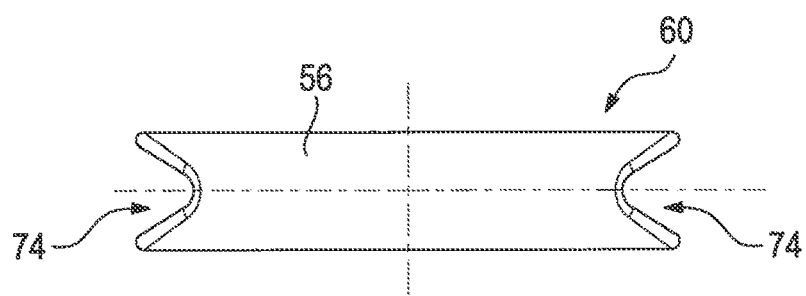
FIG. 13 shows a plan view of the guide part of FIG. 10.
Figure 14:
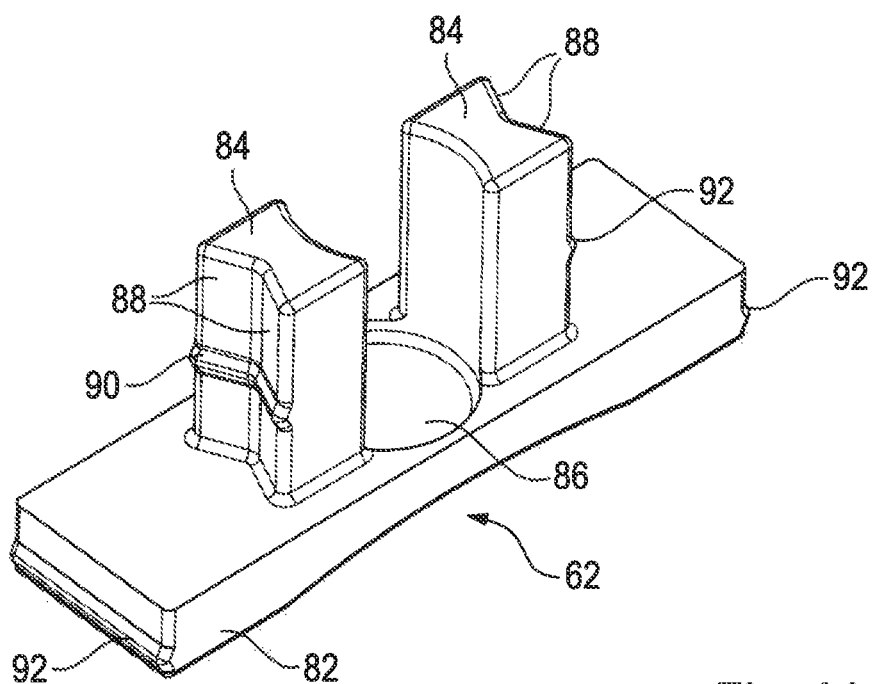
FIG. 14 shows a perspective view of the base part of the pressure piece of FIG. 9.
Figure 15:
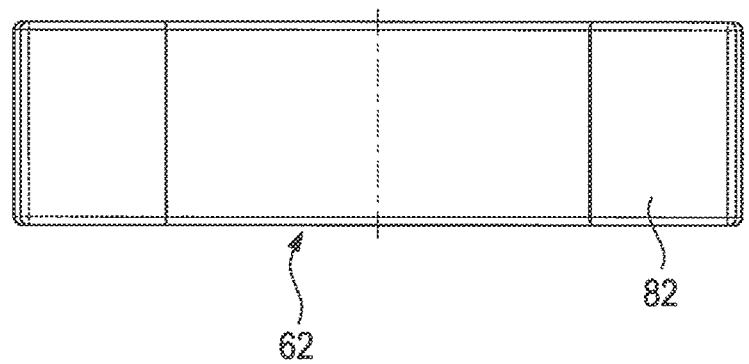
FIG. 15 shows a bottom view of the base part of FIG. 9.
Figure 16:
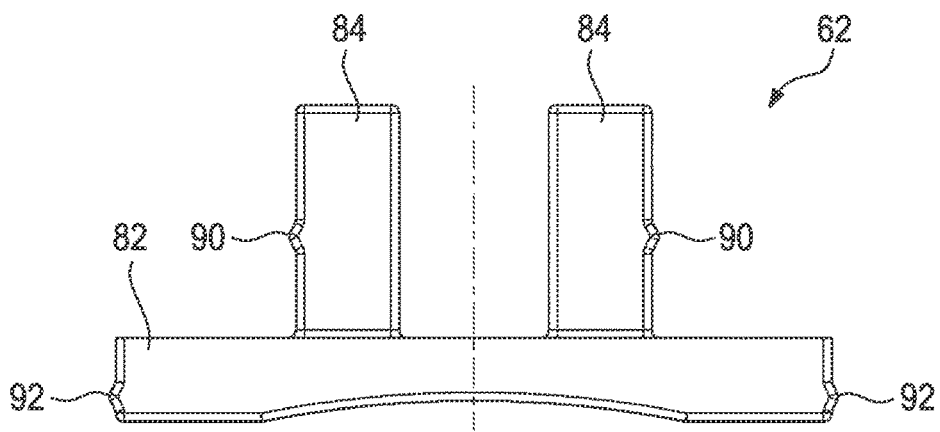
FIG. 16 shows a side view of the base part of FIG. 9.
Figure 17:
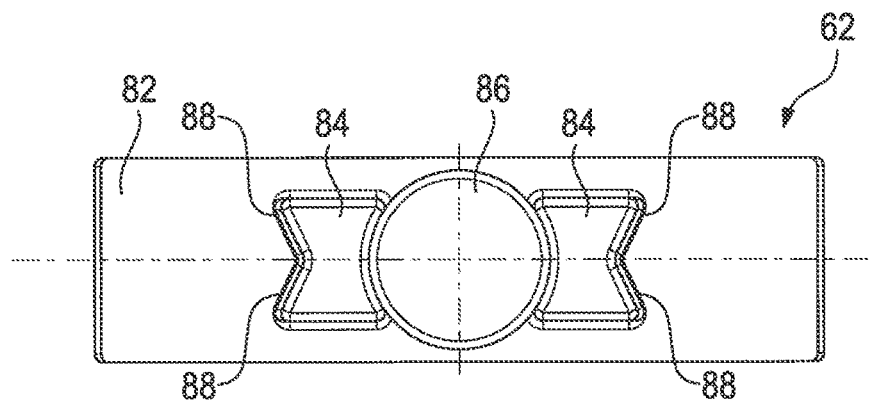
FIG. 17 shows a plan view of the base part of FIG. 9.

The two latching arms 72 are each provided with a latching configuration 80 on their inner side on the free end, said configuration being in the form of a bead or protrusion (see in particular FIG. 12).

The base part 62 (see in particular FIGS. 9 and 14 to 17) comprises a planar bottom part 82, from which two post-like protrusions 84 extend, which protrusions together form a spring bearing for the compression spring 64. A circular depression 86 is provided in this case between the two protrusions 84 and is used to receive an and of the compression spring 64. However, the depression is not absolutely necessary.

The two protrusions 84 are curved on their mutually facing inner sides, wherein the radius of curvature is adapted to the outer diameter of the compression spring 64. The outer surfaces, facing away from each other, of the protrusions 84 are provided with sliding guide surfaces 88 which are inclined in the same manner as the sliding guide surfaces 78 on the guide part 60. The sliding guide surfaces 78 of the guide part 60 form, together with the sliding guide surfaces 88 of the base part 62, a sliding guide, along which the guide part 60 is guided and received thereon so as to be displaceable relative to the base part 62.

Each of the sliding guide surfaces 88 of the protrusions 84 of the base part 62 is provided with a latching configuration 90 which likewise is in the form of a bead or protrusion. The latching configuration 90 is arranged, as seen starting from the bottom part 82, in the order of magnitude of a third of the height of the protrusions 84.

The smaller end faces, facing away from each other, of the bottom part 82 of the base part 62 are each formed as clip-in ends 92. For this purpose, small, bead-like protrusions are provided on the end faces.

Figure 9:
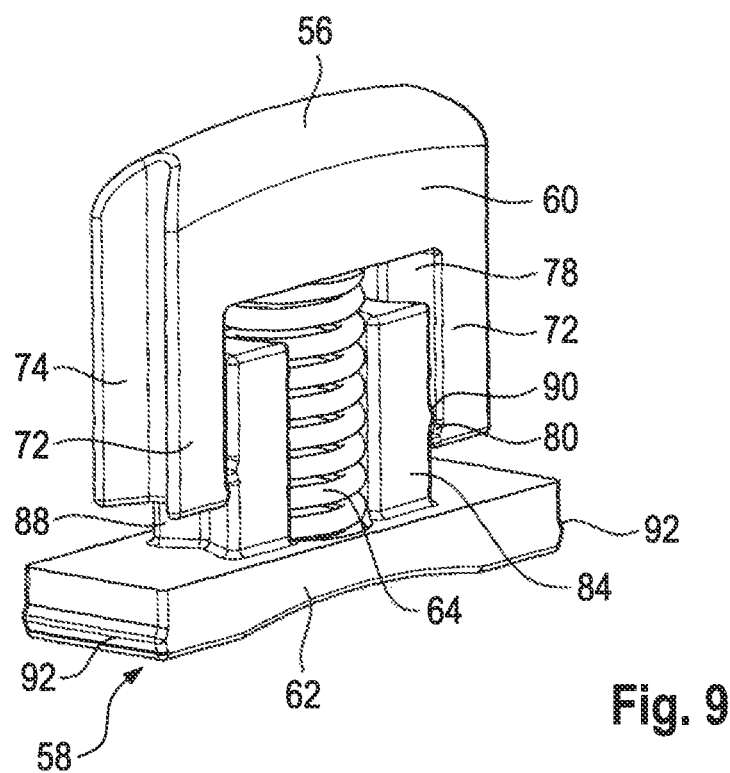
FIG. 9 shows a perspective view of a pressure piece which is used in the transmitter in accordance with the invention.
Figure 10:
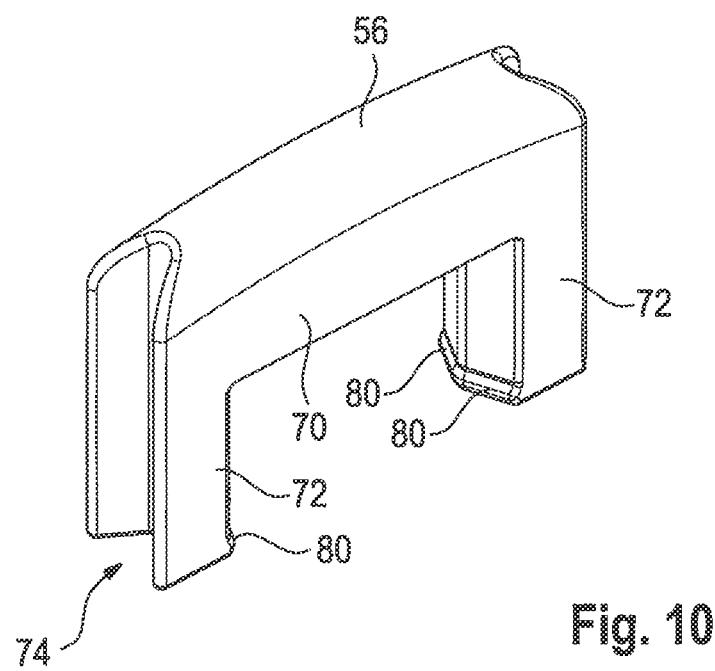
FIG. 10 shows a perspective view of the guide part of the pressure piece of FIG. 9.

Each pressure piece 58 forms a pre-assembled unit (see FIG. 9). This unit consists of the base part 62, the guide part 60 and the compression spring 64.

In order to assemble a pressure piece, the compression spring 64 is inserted between the two protrusions 84. Then, the guide part 60 is placed on the base part 62 such that the latching configurations 80 of the latching arms 72 latch behind the latching configurations 90 of the protrusions 84 (see the state in FIG. 9). In this state, the compression spring 64 is slightly biassed. However, it is not able to separate the guide part 60 from the base part 62 because its spring force is lower than the holding force of the form-fitting coupling of the latching configurations 80 and 90.

The pressure pieces 58 are inserted into the recesses 46 of the transmitter disk 12 such that the guide surfaces 76 co-operate with the bevels 52 on the edges 50 of the recesses 46 (see in particular FIG. 7). The guide parts 60 are hereby accommodated in the recesses 46 so as to be displaceable in the radial direction, but are reliably held therein in the axial direction.

Figure 6:
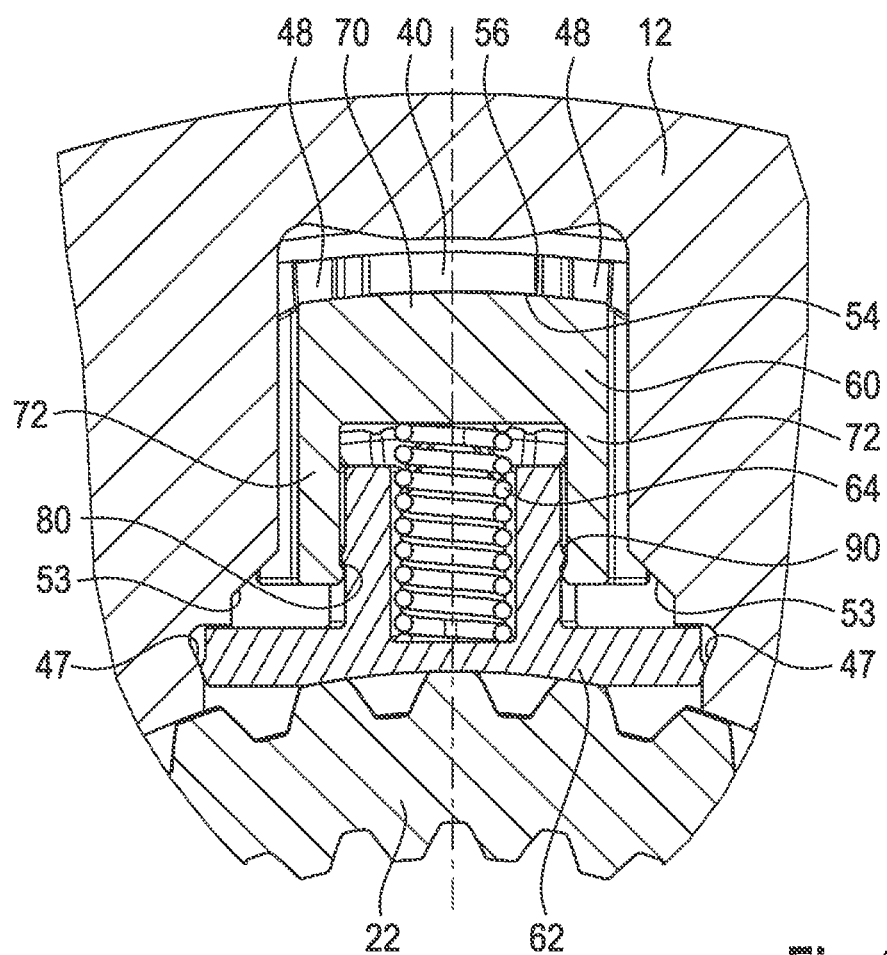
FIG. 6 shows an enlarged view of the section VI of FIG. 3.

Insertion of the pressure pieces 58 into the recesses 46 is facilitated by insertion contours 53 which are attached to the edges 50 on the radially inner side (see in particular FIG. 6).

Upon assembly of the pressure pieces 58 in the recesses 46 of the transmitter disk 12, the clip-in ends 92 of the base parts 62 engage into a suitably formed holding section 47 on the radially inner end of each recess 46 (see in particular FIG. 6). As a result, the pressure pieces 58 are pre-assembled in the transmitter disk 12 (see also FIG. 8).

Figure 4:
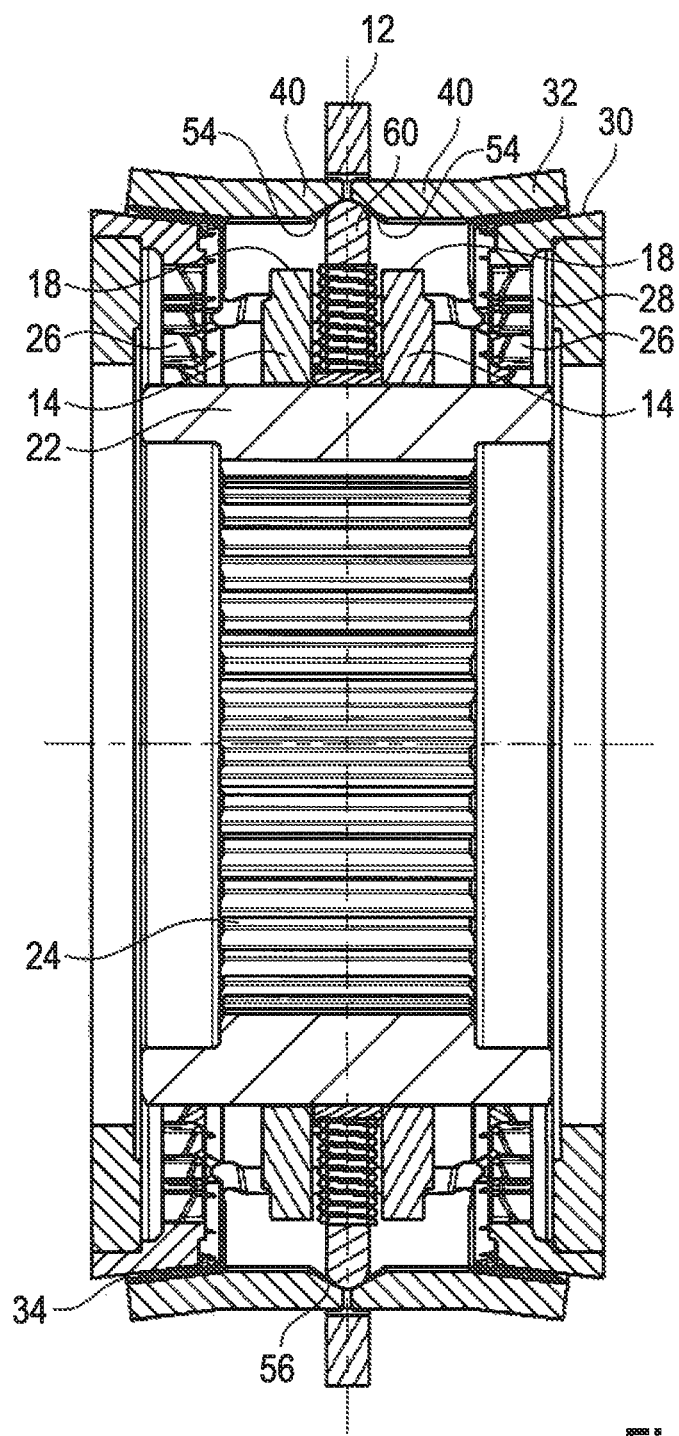
FIG. 4 shows a sectional view along plane IV-IV of FIG. 3.
Figure 5:
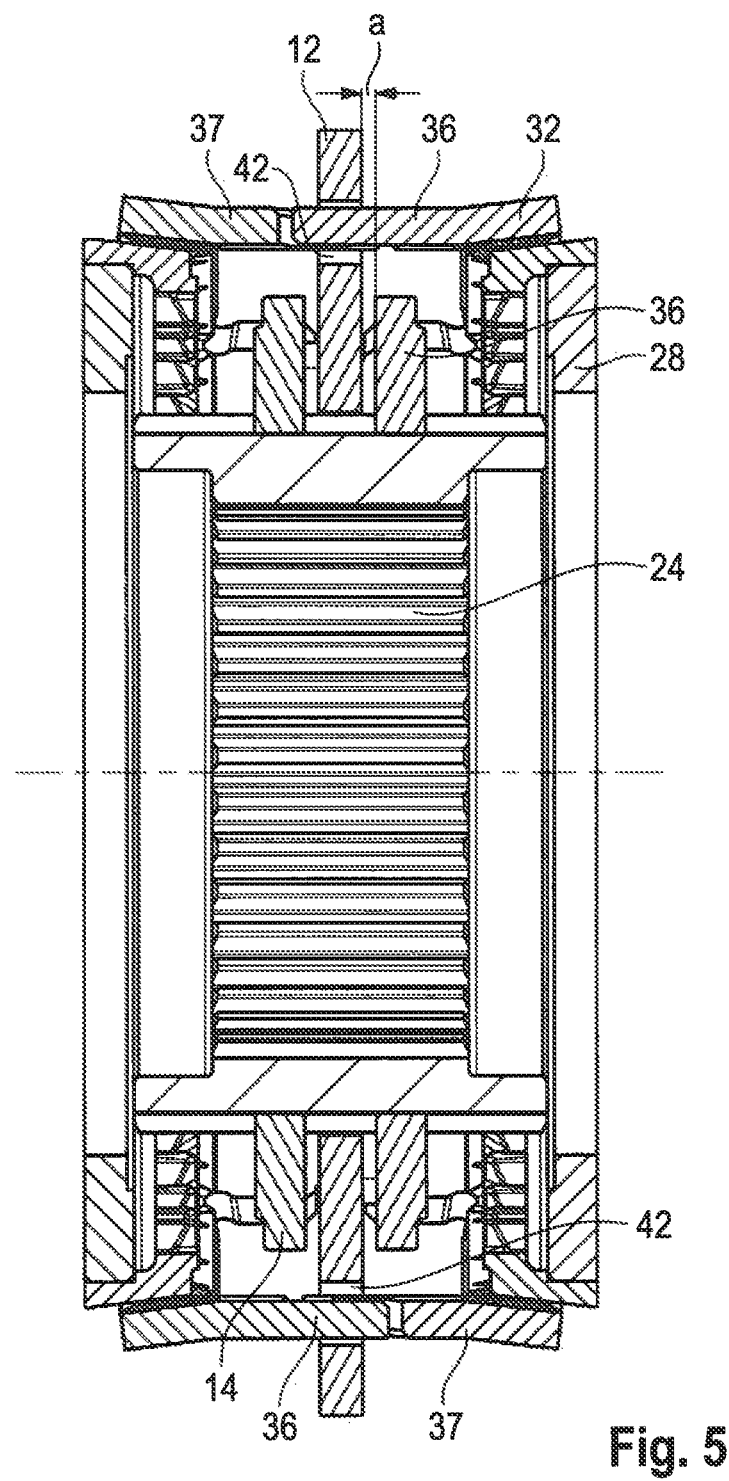
FIG. 5 shows a sectional view along plane V-V of FIG. 3.

If the synchronising rings 32 are mounted on the transmitter disk 12, the pressure surfaces 56 of the pressure pieces 58 adjoin the two mutually facing centring bevels 54 of the locking lugs 40 (see FIGS. 4 and 6). Since the pressure surfaces 56 are curved in the circumferential direction, a line contact is produced.

When the transmitter disk 12 is mounted on the transmitter sleeve 22, the base part 62 lies on the outer toothed arrangement 20 of the transmitter sleeve 22 (see FIG. 6) and therefore the base part 62 is supported in the radial direction. Therefore, if the guide part 60 is adjusted inwardly in the radial direction (in an interconnected position of the transmitter disk 12) and thus the compression spring 64 is biassed to a greater extent than in the initial state, the base part 62 also cannot be pushed inwards out of the holding section 47.

The manner in which the clutch disks 14 are fastened to the side surfaces of the transmitter disk 12 will be described hereinafter with reference to FIGS. 18 to 22.

The two clutch disks 14 are welded to the transmitter disk 12, and in particular by projection welding (i.e. resistance welding at predetermined points).

Each clutch disk 14 is fastened to the transmitter disk 12 at four welding points 100 evenly spaced apart from each other in the circumferential direction. These are defined by material protrusions 102 which are produced alternately in opposite directions by plastic deformation of the material of the transmitter disk 12, and in particular in a direction perpendicular to the plane which is defined by the transmitter disk (perpendicular to the plane of the drawing of FIG. 18 and in the direction of the arrow P in FIG. 19). A depression 104 is thereby formed on the side opposite the material protrusion 102.

The material protrusions 102 which subsequently form the welding points 100 are formed on spacers 106 which are likewise formed by plastic deformation of the material of the transmitter disk 12. The spacers 106 are produced in that the transmitter disk 12 is provided with an embossed portion 108 (see in particular FIG. 19) on the opposite side.

Figure 18:
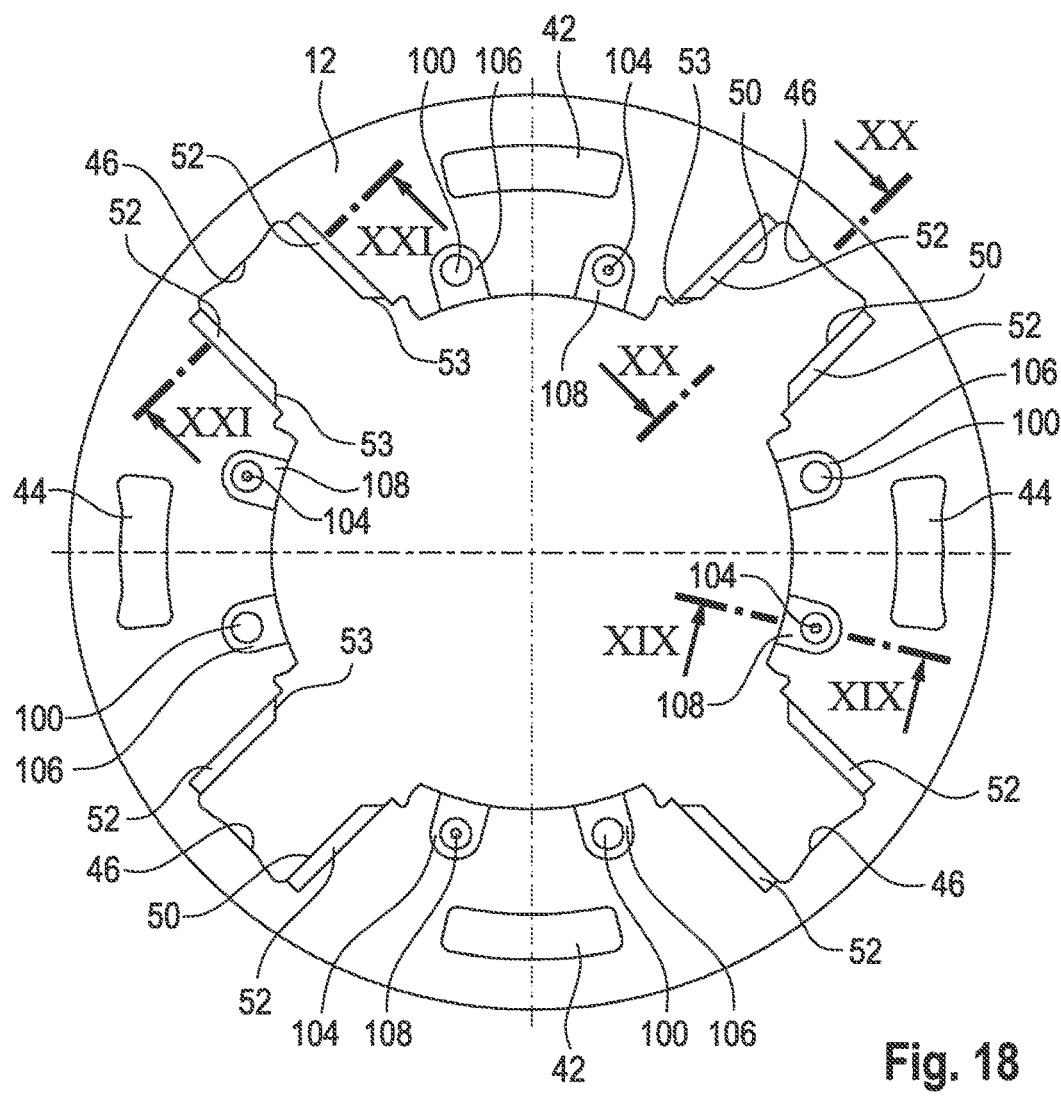
FIG. 18 shows a side view of the transmitter disk.

As can be seen in FIG. 18, the spacers 106 and the embossed portions 108 are each arranged in pairs in the same sequence between adjacent recesses 46 for the pressure pieces 58.

Figure 22:
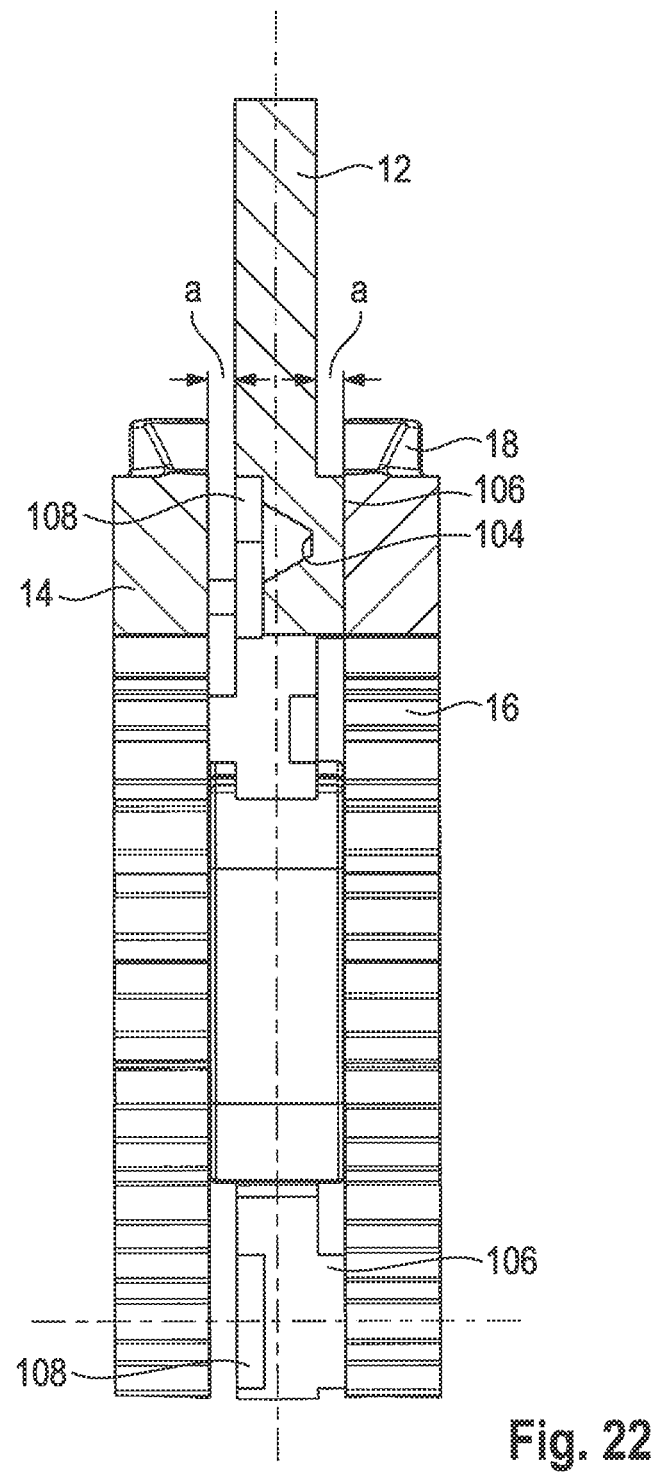
FIG. 22 shows a sectional view along plane XXII-XXII of FIG. 3.

The spacer 106 ensures that a distance a is provided in each case between the transmitter disk 12 and the clutch disks 14 (see for example FIG. 22). The distance a allows a compression spring 64 to be used which has a diameter greater than the thickness of the transmitter disk 12. A spring having a higher spring constant can hereby be used.

Figure 19:
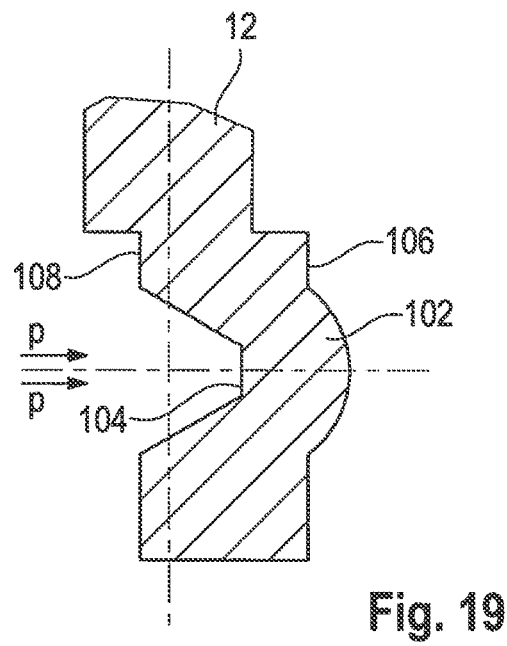
FIG. 19 shows a sectional view along line XIX-XIX of FIG. 18.
Figure 20:
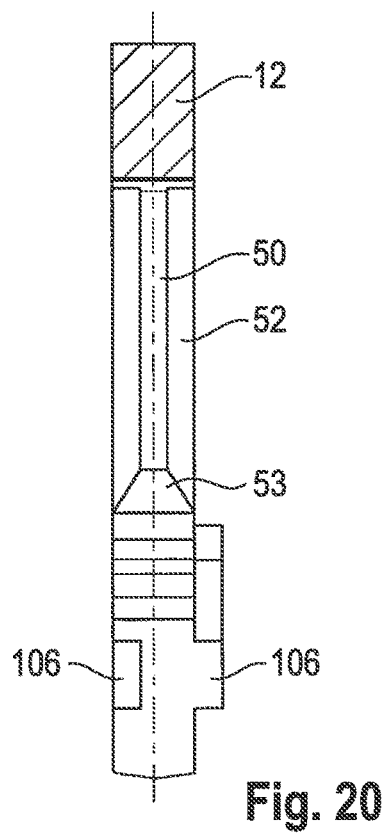
FIG. 20 shows a sectional view along plane XX-XX of FIG. 18.
Figure 21:
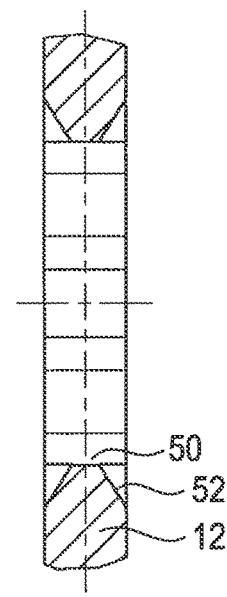
FIG. 21 shows a sectional view along plane XXI-XXI of FIG. 18.

FIG. 19 illustrates the spacers 106 in a state in which the transmitter disk 12 is produced as a blank. The material protrusions 102 are provided in this state.

In order to connect the transmitter disk 12 to the two clutch disks 14, these are arranged and oriented on the two side surfaces of the transmitter disk 12. Then, they are fastened to one another by projection welding or resistance welding, wherein the material protrusions 102 melt on the spacers 106 so that the clutch disks 14 lie flat on the spacers 106. This can be seen on the one hand in FIG. 22 and on the other hand in FIG. 20 in which the spacers 106 are shown without the material protrusions 102. Welding points 100 remain in place of the material protrusions 102, wherein the clutch disks 14 are materially bonded to the transmitter disk 12 at said welding points.

After the clutch disks 14 have been welded to the transmitter disk 12, the thus formed assembly is hardened. This can occur in that the assembly is heated and then quickly cooled.

Depending upon the distortion due to hardening which is to be expected and can be tolerated, the assembly can either be freely hardened or even hardened on a mandrel, the outer contour of which corresponds precisely to the transmission shaft toothed arrangement 16 of the clutch disks 14; it is hereby ensured that the transmission shaft toothed arrangements 16 have a desired contour even after hardening.

After hardening, the pressure pieces 58 can be mounted in the recesses 46 where the base parts 62 latch into the holding sections 47.

The invention claimed is:

1. A transmitter for a synchronizing assembly of a manual transmission, having a transmitter disk and at least one clutch disk which is arranged on a side surface of the transmitter disk, wherein the clutch disk and the transmitter disk are fixedly connected together by local welding points.

2. The transmitter of claim 1 wherein projections, which form the welding points, are provided on a side surface of the transmitter disk facing a clutch disk.

3. The transmitter of claim 2 wherein spacers are provided on a side surface of the transmitter disk facing a clutch disk, on which spacers the projections are formed.

4. The transmitter of claim 3 wherein four spacers are provided between a clutch disk and the transmitter disk.

5. The transmitter of claim 1 wherein four spacers are provided between a clutch disk and the transmitter disk.

6. A method for producing a transmitter for a synchronizing assembly of a manual transmission by means of the following steps:
providing a clutch disk and a transmitter disk;
fastening together the clutch disk and the transmitter disk by means of projection welding to form an assembly;
hardening the thus formed assembly.

7. The method of claim 6 wherein the assembly is freely hardened.

8. The method of claim 6 wherein the assembly is hardened on a mandrel.

9. The method of claim 6 wherein the transmitter disk is provided with at least one recess, a pressure piece being mounted in the recess after the assembly has been hardened.

10. The method of claim 9 wherein the pressure piece is clipped into the recess.

11. The method of claim 9 wherein the pressure piece is provided with a base part and a guide part, wherein the base part is located between two clutch disks which are arranged on sides of the transmitter disk facing away from each other, and in that the guide part is guided in the axial direction between edges of the recess which are opposite one another in the circumferential direction.

* * * * *